United States Patent
Lagun et al.

(10) Patent No.: US 12,254,685 B2
(45) Date of Patent: *Mar. 18, 2025

(54) EYE GAZE TRACKING USING NEURAL NETWORKS

(71) Applicant: Google LLC, Mountain View, CA (US)

(72) Inventors: Dmitry Lagun, San Jose, CA (US); Junfeng He, Fremont, CA (US); Pingmei Xu, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/094,933

(22) Filed: Jan. 9, 2023

(65) Prior Publication Data

US 2023/0274537 A1 Aug. 31, 2023

Related U.S. Application Data

(63) Continuation of application No. 17/102,337, filed on Nov. 23, 2020, now Pat. No. 11,551,377, which is a (Continued)

(51) Int. Cl.
*G06V 10/82* (2022.01)
*G06F 3/01* (2006.01)
(Continued)

(52) U.S. Cl.
CPC ............ *G06V 10/82* (2022.01); *G06F 3/013* (2013.01); *G06F 18/211* (2023.01);
(Continued)

(58) Field of Classification Search
CPC . G06T 2207/20081; G06T 2207/20084; G06T 7/70–7/77; G06T 2207/30041;
(Continued)

(56) References Cited

U.S. PATENT DOCUMENTS 10,016,130 B2 7/2018 Ganesan
10,127,680 B2 11/2018 Lagun et al.
(Continued)

FOREIGN PATENT DOCUMENTS

CN 102930252 A 2/2013
CN 104951084 A 9/2015
(Continued)

OTHER PUBLICATIONS

"Samsung Galaxy S8—Full phone specifications", Gsmarena, website https://www.gsmarena.com/samsung_galaxy_s8-8161.php, 3 pages, downloaded Jan. 25, 2024. Gsmarena describes the "device characteristics" of the Samsung Galaxy S8, as released on Apr. 24, 2017. (Year: 2017).*

(Continued)

*Primary Examiner* — Wassim Mahrouka
(74) *Attorney, Agent, or Firm* — Fish & Richardson P.C.

(57) ABSTRACT

Methods, systems, and apparatus, including computer programs encoded on computer storage media, for characterizing a gaze position of a user in a query image. One of the methods includes obtaining a query image of a user captured by a camera of a mobile device; obtaining device characteristics data specifying (ii) characteristics of the mobile device, (ii) characteristics of the camera of the mobile device, or (iii) both; and processing a neural network input comprising (i) one or more images derived from the query image and (ii) the device characteristics data using a gaze prediction neural network, wherein the gaze prediction neural network is configured to, at run time and after the gaze prediction neural network has been trained, process the neural network input to generate a neural network output that characterizes a gaze position of the user in the query image.

20 Claims, 5 Drawing Sheets

Related U.S. Application Data continuation of application No. 16/188,255, filed on Nov. 12, 2018, now Pat. No. 10,846,877, which is a continuation-in-part of application No. 15/195,942, filed on Jun. 28, 2016, now Pat. No. 10,127,680.

(51) Int. Cl.

| | | |
|---|---|---|
| *G06F 18/211* | (2023.01) | |
| *G06F 18/214* | (2023.01) | |
| *G06F 18/2413* | (2023.01) | |
| *G06T 7/73* | (2017.01) | |
| *G06T 7/80* | (2017.01) | |
| *G06V 10/764* | (2022.01) | |
| *G06V 40/16* | (2022.01) | |
| *G06V 40/19* | (2022.01) | |

(52) U.S. Cl.
CPC .......... *G06F 18/24133* (2023.01); *G06T 7/74* (2017.01); *G06T 7/80* (2017.01); *G06V 10/764* (2022.01); *G06V 40/19* (2022.01); *G06F 18/214* (2023.01); *G06T 2207/20081* (2013.01); *G06T 2207/20084* (2013.01); *G06T 2207/30201* (2013.01); *G06V 40/161* (2022.01)

(58) Field of Classification Search
CPC .......... G06N 3/02–3/105; G06N 20/00–20/20; G06F 3/013; H04N 13/383; A61B 3/113; G02B 27/0093; G06K 9/00597–9/00604
See application file for complete search history.

(56) References Cited

U.S. PATENT DOCUMENTS

| | | | |
|---|---|---|---|
| 2003/0218672 | A1 | 9/2003 | Zhang et al. |
| 2007/0011609 | A1 | 1/2007 | Adjouadi et al. |
| 2013/0058529 | A1 | 3/2013 | Levin |
| 2014/0145935 | A1 | 5/2014 | Sztuk et al. |
| 2017/0372487 | A1 | 12/2017 | Lagun et al. |
| 2020/0058136 | A1 | 2/2020 | Morishita |

FOREIGN PATENT DOCUMENTS

| | | |
|---|---|---|
| CN | 104978548 A | 10/2015 |
| WO | WO 1999/26126 | 5/1999 |
| WO | WO 2014/061017 | 4/2014 |

OTHER PUBLICATIONS

"Samsung Galaxy S8 Review—Specifications", ePhotozine, website https://www.ephotozine.com/article/samsung-galaxy-s8-review-30876/specifications, 7 pages, downloaded Jan. 25, 2024. ePhotozine describes the "camera characteristics" of the Samsung Galaxy S8, as released on Apr. 24, 2017. (Year: 2017).*

Abdel-Hamid et al., "Convolutional Neural Networks for Speech Recognition," IEEE/ACM Transactions on Audio, Speech, and Language Processing, 2014, 22(10):1-13.

Bleicher, "Eye-Tracking Software Goes Mobile," IEEE Spectrum, Apr. 23, 2013, retrieved on Jul. 15, 2016, retrieved from URL<http://spectrum.ieee.org/computing/software/eyetracking-software-goes-mobile>, 2 pages.

Office Action in Chinese Application No. 201780033419.9, dated Aug. 6, 2019, 17 pages (with English Translation).

Office Action in Chinese Application No. 201780033419.9, dated Mar. 9, 2020, 16 pages (with English Translation).

Demjén et al., "Eye Tracking Using Artificial Neural Networks for Human Computer Interaction," Physiol. Res., Aug. 2011, 60(5):841-844.

International Preliminary Report on Patentability in International Appln. No. PCT/US2017/039651, mailed on Jan. 10, 2019, 9 pages.

International Search Report and Written Opinion issued in International Application No. PCT/US2017/039651, mailed on Sep. 6, 2017, 14 pages.

Pomerleau et al., "Non-Intrusive Gaze Tracking Using Artificial Neural Networks," AAAI Technical Report FS-93-04, 1993, pp. 153-156.

Pomplun et al., "An Artificial Neural Network for High Precision Eye Movement Tracking," KI-94: Advances in Artificial Intelligence, vol. 861 of the series Lecture Notes in Computer Science, Jun. 2005, pp. 63-69.

Sesin et al., "Adaptive eye-gaze tracking using neural-network-based user profiles to assist people with motor disability," Journal of Rehabilitation Research & Development, 2008, 45(6):801-818.

Zhang et al. "Appearance-Based Gaze Estimation in the Wild," CVPR2015, Computer Vision Foundation, 2015, pp. 4511-4520.

* cited by examiner

┌─────────────────────────────────┐
│  Determine size of display screen │
│              502                 │
└─────────────────────────────────┘
              │
              ▼
┌─────────────────────────────────┐
│ Divide display screen into       │
│ plurality of regions             │
│              504                 │
└─────────────────────────────────┘
              │
              ▼
┌─────────────────────────────────┐
│ For each region, display visible │
│ marker in a position in the region│
│              506                 │
└─────────────────────────────────┘
              │
              ▼
┌─────────────────────────────────┐
│ For each region, obtain image    │
│ using front facing camera whilst │
│ visible marker displayed in position│
│              508                 │
└─────────────────────────────────┘
              │
              ▼
┌─────────────────────────────────┐
│ Generate (i) a respective        │
│ calibration image of the user,   │
│ and (ii) a respective calibration│
│ label that labels a known gaze   │
│ position or region of the user   │
│ for the calibration image        │
│              510                 │
└─────────────────────────────────┘
```

FIG. 5

EYE GAZE TRACKING USING NEURAL NETWORKS

CROSS-REFERENCE TO RELATED APPLICATIONS

This is a continuation of U.S. application Ser. No. 17/102,337, filed on Nov. 23, 2020, which is a continuation of U.S. application Ser. No. 16/188,255, filed on Nov. 12, 2018 (now U.S. Pat. No. 10,846,877), which is a continuation-in-part of U.S. application Ser. No. 15/195,942, filed on Jun. 28, 2016 (now U.S. Pat. No. 10,127,680). The disclosures of the prior applications are considered part of and are incorporated by reference in the disclosure of this application.

BACKGROUND

This specification relates to processing inputs through the layers of a neural network to generate outputs.

Neural networks are machine learning models that employ one or more layers of nonlinear units to predict an output for a received input. Some neural networks include on or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in a method for characterizing a gaze position of a user in a query image. The method includes the actions of: obtaining a query image of a user captured by a camera of a mobile device; obtaining device characteristics data specifying (ii) characteristics of the mobile device, (ii) characteristics of the camera of the mobile device, or (iii) both; and processing a neural network input comprising (i) one or more images derived from the query image and (ii) the device characteristics data using a gaze prediction neural network, wherein the gaze prediction neural network is configured to, at run time and after the gaze prediction neural network has been trained, process the neural network input to generate a neural network output that characterizes a gaze position of the user in the query image. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages.

The described gaze estimation techniques allow the gaze position of a user of a mobile device to be accurately estimated using only a query image captured by a front-facing camera of the mobile device. In other words, the described techniques allows gaze to be efficiently estimated on the mobile device and without requiring any specialized hardware. In particular, the described techniques incorporate device characteristics into the prediction to generate a more accurate estimate of the gaze, i.e., an estimate that accounts for the field of view of the mobile device camera and the location of the camera on the mobile device. By incorporating the device characteristics into the prediction as described above, the same gaze prediction neural network can be used to generate accurate predictions for different mobile devices having different characteristics. In particular, the same neural network can be deployed on many different devices with different cameras and other properties that affect gaze prediction. The neural network requires only minimal fine-tuning once deployed on a new kind of device to generate accurate predictions and does not require any calibration images to be provided with the query image at run time in order to make an accurate prediction.

The details of one or more embodiments of the subject matter of this specification are set forth in the accompanying drawings and the description below. Other features, aspects and the advantages of the subject matter will become apparent form the description, the drawings and the claims.

DETAILED DESCRIPTION

Figure 1:
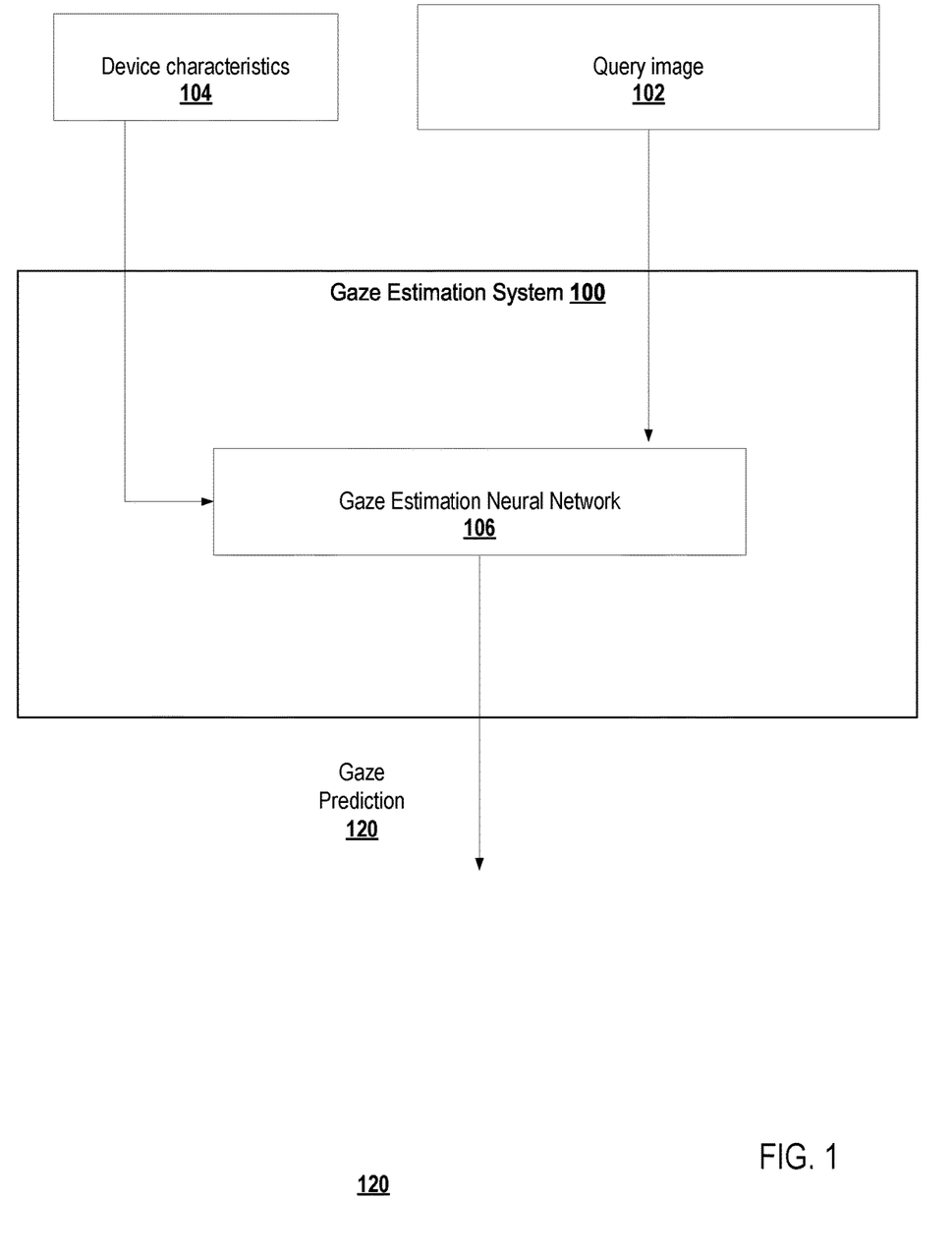
FIG. 1 shows an example gaze estimation system.

FIG. 1 shows an example gaze estimation system 100. The gaze estimation system 100 is an example of a system implemented as computer programs on one or more computers in one or more locations, in which the systems, components, and techniques described below can be implemented.

The gaze estimation system 100 is a system that estimates the gaze position of a user of a mobile device. In particular, in some implementations, the gaze estimation system 100 is implemented on the mobile device and can generate gaze predictions without transmitting information over a network.

A gaze prediction is an estimate of where on the display of the mobile device the gaze of the user's eye or eyes is directed. In particular, the gaze prediction identifies a location on the display of the mobile device that is likely to be the location where the gaze of the user is directed at a particular point in time. For example, the gaze prediction can be the x and y coordinates of the estimated gaze location in a coordinate system along the display of the mobile device, where the x dimension is along the width of the display, the y dimension is along the height of the display, and the coordinate system is centered at the top-left corner of the display when the display is in portrait mode.

In more detail, the gaze estimation system 100 receives a query image 102 captured by a camera of the mobile device and device characteristics data 104 and processes a neural network input that includes (i) one or more images derived from the query image 102 and (ii) the device characteristics data 104 using a gaze estimation neural network 106 to generate a gaze prediction 120 that is an estimate of the gaze position of the user in the query image 102, i.e., an estimate of the gaze position of the user when the query image 102 was captured. Generally, the query image 102 will be an image captured by a front-facing camera of the mobile device while the user is viewing the display of the mobile device.

As will be described in more detail below, the device characteristics identified in the data 104 include characteristics of the mobile device, characteristics of the camera of the mobile device, or both. For example, the characteristics data can identify one or more of: the manufacturer of the mobile device, the model of the mobile device, the current orientation of the camera that captured the query image (e.g., portrait, landscape, left landscape, or right landscape), or whether certain settings of the camera are enabled or disabled (e.g., flash, image stabilization, and so on).

Generating the gaze prediction using the neural network will be described in more detail below with reference to FIGS. 2 and 3.

Once the gaze prediction 120 is generated, the gaze prediction 120 can be used by the mobile device in any of a variety of ways.

For example, the mobile device can allow the user to interact with or control certain functions of the mobile device using visual attention, i.e., by changing their gaze position to view different areas on the display. The gaze prediction generated by the system can then be treated as a user input to, e.g., the operating system of the mobile device or other software running on the mobile device. As a simplified example, the gaze prediction can be provided as an input along with a voice input submitted by the user that relates to content displayed at a particular position on the display (e.g., "what about this photo?" or "navigate me there") and used by the mobile device to identify which content is being referred to by the voice input.

Figure 2:
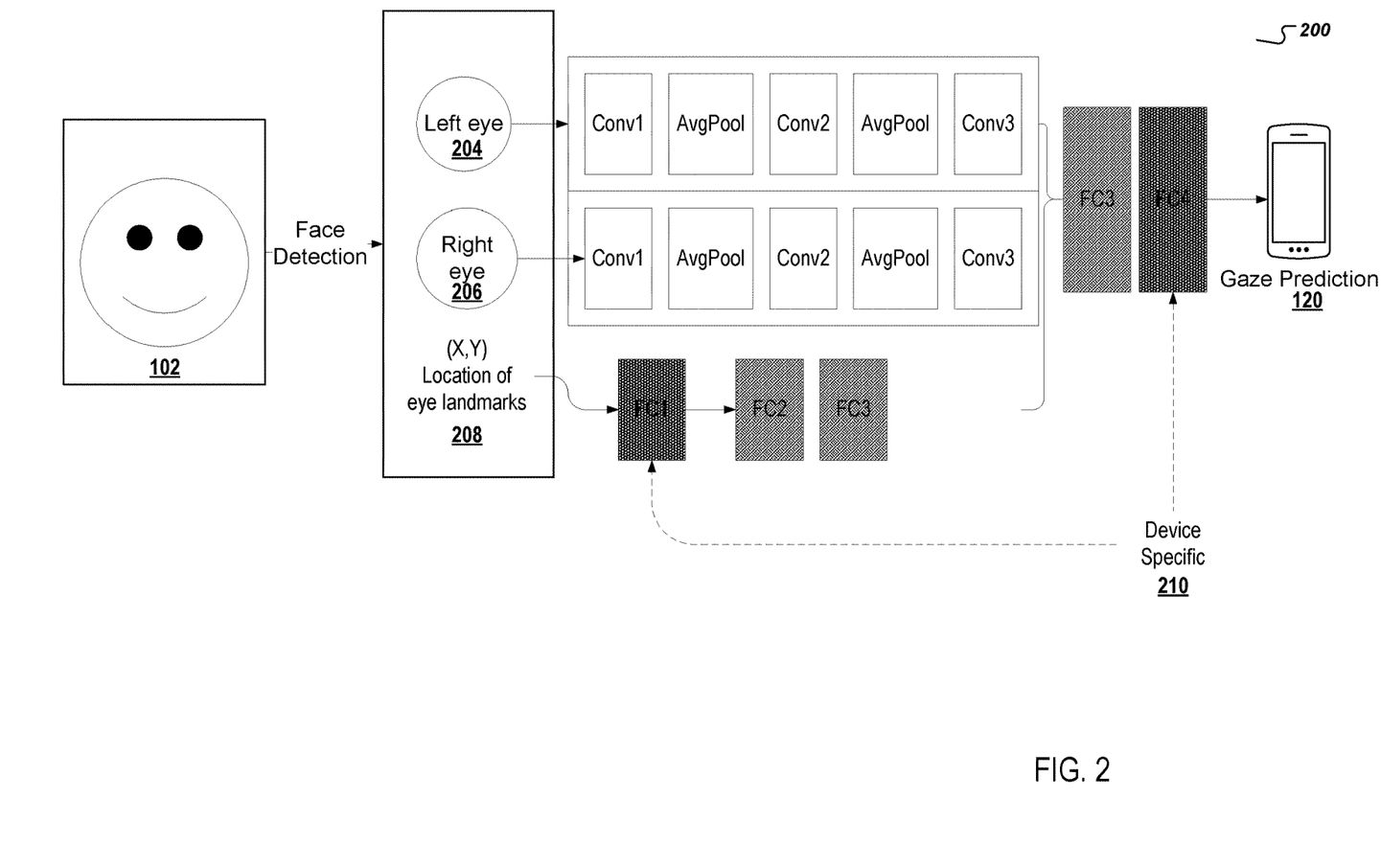
FIG. 2 is a diagram of the processing performed by the gaze estimation system to generate a gaze prediction.

FIG. 2 is a diagram 200 of the processing performed by the gaze estimation system 100 to generate a gaze prediction.

In the depicted example, the system generates, from the query image 102 of the face of the user, one or more images that are derived from the query image 102.

In particular, the system generates a left eye image crop 204 that depicts the left eye of the user and a right eye image crop 206 that depicts the right eye of the user. The system also generates locations of a set of eye landmarks 208. For example, the system can apply conventional face detection techniques to identify the portions of the query image 102 that depict the left eye and the right eye and then crop the identified portions to generate the left eye image crop 204 and the right eye image crop 206. The system can use the same face detection techniques to locate certain eye landmarks. These eye landmarks can include, for each eye, one or more boundaries of the eye, e.g., the left corner of the eye, the top of the eye, the bottom of the eye, and the right corner of the eye, and so on.

The system then processes the left image crop 204, the right eye image crop 206, and the eye landmark locations 208 using the neural network 106 to generate the gaze prediction 120. In some cases, the neural network input can also include the size of the query image in pixels. In some cases, the gaze prediction 120 is the predicted location of the gaze position in the (x, y) coordinate system described above. In some other cases, the neural network output is the mean and variance of a distribution, e.g., a normal distribution, over possible gaze positions. In these cases, after training, the gaze prediction 120 can be the mean of the distribution. In some of these cases, after training, the gaze prediction 120 can be discarded if the variance exceeds a threshold or the system can otherwise indicate that there is a high level of uncertainty in the prediction if the variance exceeds the threshold.

In particular, the neural network 106 has parameters that include device-independent parameters and device-dependent parameters. Device-independent parameters are parameters that have the same values no matter what device characteristics are identified by the characteristics data 104. Device-dependent parameters are parameters that have different values for different device characteristics. Generally, the neural network 106 has a relatively large number of device-independent parameters and only a small number of device-dependent parameters relative to the number of device-independent parameters.

To generate the gaze prediction, the neural network 106 sets the values of the device-dependent parameters to values that correspond to the device characteristics identified by the characteristics data 104. That is, the neural network or, more generally, the system maintains data associating certain values for the device-dependent parameters with the characteristics identified in the characteristics data 104 and sets the values of the device-dependent parameters to be the certain values for the processing of the query image 102.

In particular, factors such as differences in field of view between different cameras and different locations of front-facing cameras on different mobile devices cause training a single gaze estimation neural network to accurately predict gaze positions from images taken across multiple devices to be difficult.

In particular, an image of a user looking at a particular location on a display taken by different mobile devices and cameras can result in different query images, e.g., because the camera is located in different places on different mobile device.

Furthermore, the query image can be taken at different distances from the camera. This affects where the right and left eye are located and by consequence the location of the eye landmarks. The field of view of the camera sensor reflects how much of the observable world is captured in the image. Thus, the field of view affects the perceived distance, i.e., the size of the object in the image. For example, if the field of view is smaller and less of the observable world is captured, the object appears larger. Whereas, if the camera had a larger field of view, the object and surrounding environment would be captured and the object appears smaller relative to the environment.

By including a small number of device-dependent parameters and applying those parameters as will be described below, the gaze prediction neural network can accurately predict gaze by taking into consideration the specific characteristics of the camera of the mobile device without requiring a substantial increase in processing time or computational footprint.

More specifically, the neural network 106 can be trained on a collection of training data that includes query images taken using various different camera orientations and different mobile devices. For example, this training can be performed in a data center before the neural network 106 is deployed to the mobile device. In particular, the training data includes multiple training examples, with each training example includes (i) a query image, (ii) device characteristics data for the query, and (iii) a ground truth gaze prediction. As part of this training, trained values are determined for the device independent parameters and for device-dependent parameters that are mapped to characteristics data that is found in the training examples used to train the neural network 106, e.g., using conventional supervised learning techniques.

If the characteristics data 106 is different from the characteristics data in the training examples, i.e., the mobile device has characteristics that are not found in the training data for the neural network 106, the system can fine-tune the values of the device-dependent parameters after the neural network has been deployed on the mobile device to determine trained values of the device-dependent parameters that are mapped to the characteristics 106. Fine-tuning the device-dependent parameter values is described in more detail below with reference to FIG. 4.

In the example of FIG. 2, the neural network 106 maps the characteristics data to maintained values for two sets of device-dependent parameters: field of view parameters and location parameters. These values are then used during the processing of the cropped left and right eye images as described below.

The neural network 106 processes the cropped left and right eye images through respective stacks of convolutional neural network layers (Conv1 through Conv3). Each stack can also include one or more pooling layers, e.g., average pooling (AvgPool) or max pooling layers, that each apply pooling to the outputs of a corresponding layer in the stack of convolutional neural networks.

The neural network processes the location of eye landmarks (208) through a stack of multiple, e.g., three, fully connected layers. Prior to processing the locations through the first fully connected layer (FC1) in the fully connected stack, the neural network 106 applies a linear transformation of the initial location of each eye landmarks using the field of view parameters (aov). Specifically, the linear transformation of the x and y coordinates of the location of a given eye landmark to adjust for the camera's field of view can be represented by:

$$\text{aov\_}bx(\text{device}) + x^*\text{aov\_}wx(\text{device})$$

$$\text{aov\_}by(\text{device}) + y^*\text{aov\_}wy(\text{device})$$

where the field of view parameters aov_bx(device), aov_by(device), aoy_wx(device) and aov_wy(device) are the values of the field of view parameters mapped to the characteristics data 104.

The neural network 106 then combines, e.g., concatenates, averages, or sums, the outputs of the convolutional stacks for the left and right eye cropped images and the output of the fully connected stack for the location of the eye landmarks.

Figure 3:
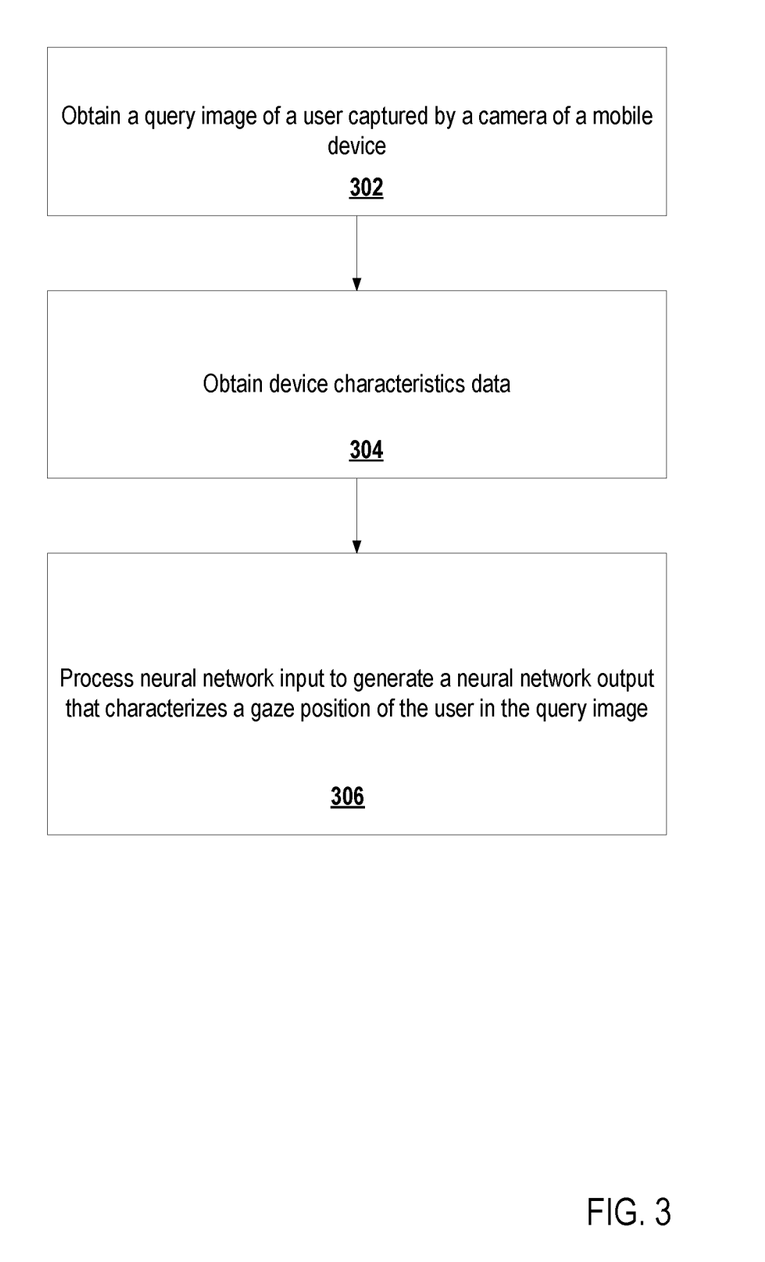
FIG. 3 is a flow chart of an example process for generating a gaze position of a user from a query image of the user.

The neural network 106 processes the combined output using one or more fully connected layers (e.g., FC4 and FC5) to generate an initial gaze prediction. The neural network 106 then applies a linear transformation to the initial gaze prediction using the camera location parameters (loc) to generate the gaze prediction 120. Specifically, the linear transformation of the x and y coordinates of the initial gaze prediction to adjust for the location of the camera can be represented by:

$$\text{loc\_}bx(\text{device}) + x^*\text{loc\_}wx(\text{device})$$

$$\text{loc\_}by(\text{device}) + y^*\text{loc\_}wy(\text{device})$$

where loc_bx(device), loc_by(device), loc_wx(device), and loc_wy(device) are the values of the location parameters mapped to by the characteristics data FIG. 3 is a flow diagram of an example process 300 for generating a gaze position of a user from a query image of the user. For convenience, the process 300 will be described as being performed by a system of one or more computers located in one or more locations. For example, a gaze estimation system, e.g., the gaze estimation system 100 of FIG. 1, appropriately programmed in accordance with this specification, can perform the process 300.

The system obtains a query image of a user captured by a camera of a mobile device (Step 302).

The system obtains device characteristics data specifying (i) characteristics of the mobile device, (ii) characteristics of the camera of the mobile device, or (iii) both (Step 304).

The system processes a neural network input that includes (i) one or more images derived from the query image and (ii) the device characteristics data using a gaze prediction neural network. The gaze prediction neural network is configured to, at run time and after the gaze prediction neural network has been trained, process the neural network input to generate a neural network output that characterizes a gaze position of the user in the query image (Step 306). For example, the neural network output can be a gaze prediction that identifies the estimated location of the user's gaze in the query image.

Figure 4:
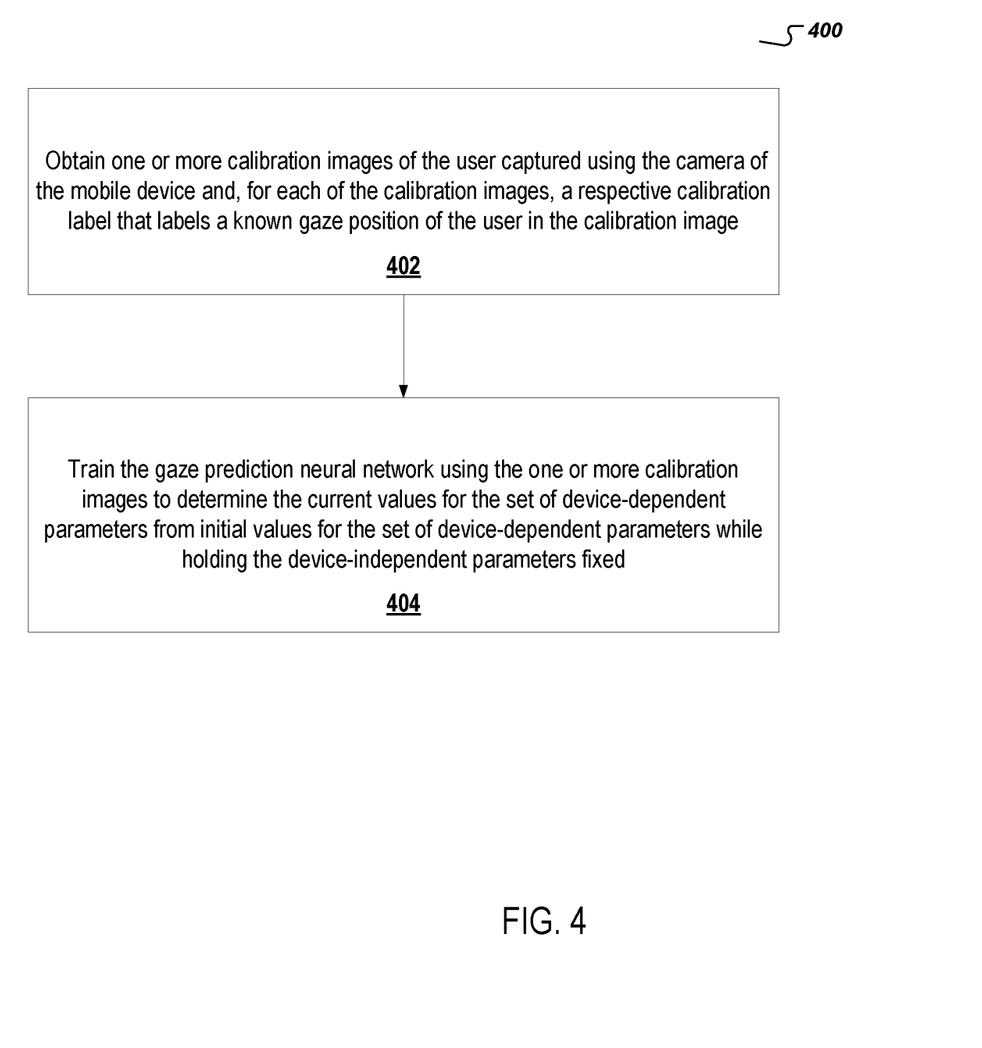
FIG. 4 is a flow chart of an example process for adjusting the device dependent parameters.

FIG. 4 is a flow diagram of an example process 400 for adjusting the device dependent parameters. For convenience, the process 400 will be described as being performed by a system of one or more computers located in one or more locations. For example, a gaze estimation system, e.g., the gaze estimation system 100 of FIG. 1, appropriately programmed in accordance with this specification, can perform the process 400.

The system can perform the process 400 to determine trained values of the device-dependent parameters after trained values of the device-independent parameters have been determined.

For example, after the gaze prediction neural network has been trained and then deployed on a mobile device, the system can determine that trained values of the device-dependent parameters for a device having the characteristics of the mobile device are not available, i.e., because the characteristics of the mobile device do not match any of the characteristics that were included in the training data used to determine the trained values of the device-dependent parameters.

As another example, the system can automatically perform the process 400 whenever the gaze prediction neural network is deployed on a new device, e.g., to account for any variability in camera operation even between mobile devices having the same manufacturer and model.

The system can perform the process 400 for each possible setting of characteristics data that is possible for a given mobile device. As an example, when the characteristics data identifies the orientation of the camera, the system can perform the process 400 for each possible orientation of the mobile device, e.g., for portrait, left landscape, and right landscape.

The system obtains one or more calibration images of the user captured using the camera of the mobile device and, for each of the calibration images, a respective calibration label that labels a known gaze position of the user in the calibration image (Step 402). Each calibration image is an image captured by the front-facing camera of the mobile device while the mobile device has the same characteristics, i.e., from the same front-facing camera of the same mobile device in the same orientation.

An example technique for generating the calibration images is described in more detail below with reference to FIG. 5.

The system trains the gaze prediction neural network using the one or more calibration images to determine trained values for the set of device-dependent parameters from initial values for the set of device-dependent parameters while holding the device-independent parameters fixed (Step 404). The device dependent parameters can be learned by minimizing a loss function. In particular, either a mean squared error loss function or a negative log likelihood loss function may be used.

The mean squared error seeks to minimize the following function:

$$\frac{1}{N}\sum_{i=1}^{N}(y_i - f(x_i))^2$$

Where $y_i$ is the calibration label for the ith calibration image, xi is the neural network input for the ith calibration image and N is the number of calibration images in the dataset.

Alternatively, when the neural network output is a mean and variance of a distribution over gaze locations, the negative log likelihood loss function may be minimized. The negative log likelihood can be represented as:

$$-\log p_\theta(y_n|x_n) = \frac{\log \sigma_\theta^2(x)}{2} + \frac{(y - \mu_\theta(x))^2}{2\sigma_\theta^2(x)} + \text{constant}$$

where $y_n$ is the calibration label for the n-th calibration image, $x_n$ is the neural network input for the n-th calibration image, $\sigma_\theta^2(x)$ is the variance output by the neural network and $\mu_\theta(x)$ is the mean output by the neural network.

As described above, when the neural network output is a mean and a variance of a distribution, the neural network can be trained to output a high variance when there is a high level of uncertainty in the prediction, e.g., where input images are noisy, blurry or occluded.

When the mean square error or the negative log likelihood loss function is used, the gaze estimation neural network is trained to generate a prediction for calibration image that matches the calibration label. At each training step, the system processes a calibration image using the neural network to generate a prediction calibration label to the calibration image input. The system then adjusts the device dependent parameters of the gaze estimation neural network to penalize the model for deviations between the predicted gaze estimate and the calibration label. This is done by updating the device dependent parameters to find the values of the device dependent parameters of the gaze estimation neural network model that minimize either the mean square error or negative log likelihood loss function, i.e., by computing gradients of the loss function with respect to the device dependent parameters, e.g., using backpropagation, and determining updates to the parameters from the gradient, e.g., using the update rule corresponding to the graph convolutional neural network training procedure. In particular, neural network system determines the trained values of the device dependent parameters of the neural network from initial values of the parameters, while holding the device independent parameters of the trained gaze estimation neural network fixed. The initial values can be randomly initialized or generated through some other parameter initialization scheme.

Figure 5:
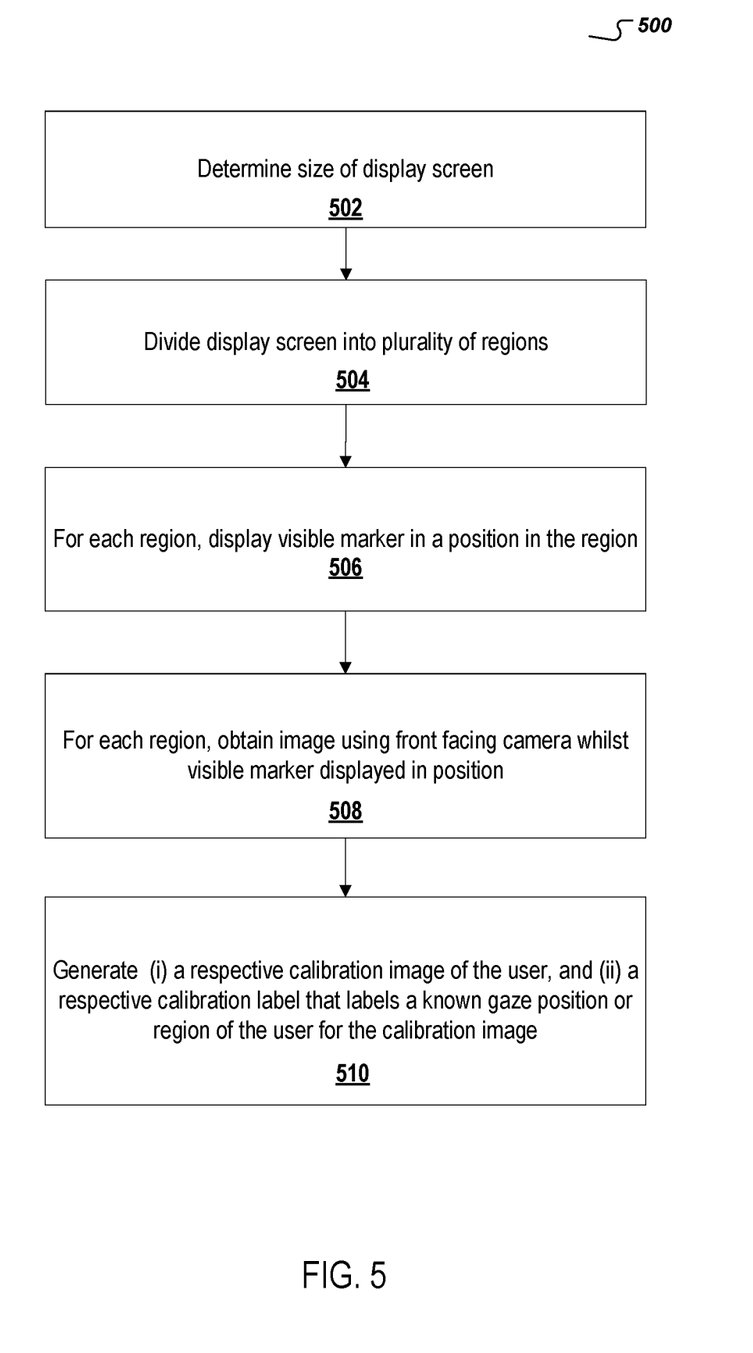
FIG. 5 is a flow chart of an example process for obtaining one or more calibration images of a user using a mobile device Like reference numbers and designations in the various drawings indicate like elements.

FIG. 5 is a flow diagram of an example process 500 for obtaining one or more calibration images of a user using a mobile device. For convenience, the process 500 will be described as being performed by a system of one or more computers located in one or more locations. For example, a gaze estimation system, e.g., the gaze estimation system 100 of FIG. 1, appropriately programmed in accordance with this specification, can perform the process 500.

The system can perform this process 500 for a small number of iterations to obtain the requisite calibration images for determining the trained values of the device dependent parameters.

The system determines a size of a display screen of the mobile device (step 502).

The system divides the display screen into multiple regions (step 504). For example, the system may divide the display screen into nine equally sized regions.

For each of the multiple regions, the system displays a visible marker in a position within the region of the display screen (step 506). In some implementations the system may randomly sample a position within a region of the display screen according to a predetermined probability distribution. For example, the system may assign a probability distribution, e.g., two-dimensional Gaussian distribution, to each region of the display screen and sample a position within the region accordingly. In other implementations the system may assign a fixed position within the region of the display screen, e.g., a position that is the center of the region of the display screen.

For each of the multiple regions, the system obtains a respective image using a front facing camera on the user device whilst the visible marker is displayed in the position within the region of the display screen (step 508). For example, the system may display a visible marker in a position within a region of the display screen and obtain an image using a front facing camera on the user device under the assumption that the user of the user device is looking at the visible marker as the image is obtained. In some implementations the system may prompt the user via a notification on the user device to look at the visible marker before obtaining an image using the front facing camera.

In some implementations the system extracts a facial region of the obtained image to obtain the calibration image, e.g., using a facial recognition application implementing standard facial recognition methods included in the gaze estimation system or otherwise running on the user device. In some implementations the system may further select an eye region of the obtained image using standard computer vision techniques.

Optionally, the system may determine whether each image obtained in step 508 is noisy, e.g., whether the image shows a user looking at a position on the display screen, whether the user has their eyes open or closed, whether the system has successfully extracted a facial region, or whether the quality of the image is sufficient using standard computer vision techniques, e.g., face or eye detection application programming interfaces. In response to determining that the obtained image is not noisy, the system accepts the image as a calibration image. In response to determining that the obtained image is noisy, the system rejects the obtained image. The system may obtain a second image to replace the rejected image by repeating step 508 above.

For each of the multiple regions, the system associates the obtained respective image with the position at which the visible marker was displayed to generate (i) a respective calibration image of the user, and (iii) a respective calibration label that labels a known gaze position or region of the user for the calibration image (step 510).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads. Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   obtaining, by a mobile device, a query image of a user captured by a camera of the mobile device;
   obtaining, by the mobile device, device characteristics data characterizing one or more of a manufacturer of the mobile device, a model of the mobile device, a current orientation of the camera, or an indication of whether certain settings of the camera or enabled or disabled;
   maintaining, by the mobile device, data associating the device characteristics data with current values for a plurality of device-dependent parameters of a gaze prediction neural network, wherein the current values of the plurality of device-dependent parameters have been determined by training the gaze prediction neural network on calibration examples each including the device characteristics data;
   processing, by the mobile device, a neural network input comprising one or more images derived from the query image using the gaze prediction neural network, wherein:
      the gaze prediction neural network has a plurality of parameters comprising i) a plurality of device-independent parameters that have been determined by training the gaze prediction neural network on training examples each including respective device characteristics data and ii) the plurality of device-dependent parameters, wherein device-independent parameters are parameters that, after training, have the same values regardless of the device characteristics data, and device-dependent parameters are parameters that have different values for different device characteristics of the mobile device;
      the gaze prediction neural network is configured to, at run time and after the gaze prediction neural network has been trained, process the neural network input to generate a neural network output that characterizes a gaze position of the user in the query image; and
      processing the neural network input comprises setting the values of the device-dependent parameters to the current values associated with the device characteristics data; and
   controlling, by the mobile device, one or more functions of the mobile device based on the neural network output.

2. The method of claim 1, wherein controlling one or more functions of the mobile device comprises providing an input to an operating system of the mobile device.

3. The method of claim 1,
wherein the gaze prediction neural network comprises a plurality of neural network layers configured to apply the device independent-parameters to generate an initial neural network output that characterizes an initial predicted gaze position of the user, and
wherein the gaze prediction neural network is configured to adjust the initial neural network output in accordance with at least some of the device-specific parameters to generate the neural network output.

4. The method of claim 3, wherein adjusting the initial neural network output comprises:
applying a linear device dependent parameters transformation to the initial neural network output.

5. The method of claim 1, wherein the neural network input further comprises data specifying a location of one or more eye landmarks in the query image.

6. The method of claim 5, wherein the gaze prediction neural network is configured to:
apply at least some of the device-specific parameters to adjust the location of the eye landmarks; and
process the adjusted location of the eye landmarks and the one or more images in accordance with the device-independent parameters to generate an initial neural network output.

7. The method of claim 1, further comprising:
obtaining one or more calibration images of the user captured using the camera of the mobile device and, for each of the calibration images, a respective calibration label that labels a known gaze position of the user in the calibration image; and
training the gaze prediction neural network using the one or more calibration images to determine the current values for the set of device-dependent parameters from initial values for the set of device-dependent parameters while holding the device-independent parameters fixed.

8. The method of claim 1, wherein the one or more images derived from the query image comprise a respective image crop corresponding to each of one or more eyes of the user.

9. A method comprising:
obtaining, by a mobile device, a query image of a user captured by a camera of the mobile device;
obtaining, by the mobile device, device characteristics data characterizing one or more of a manufacturer of the mobile device, a model of the mobile device, a current orientation of the camera, or an indication of whether certain settings of the camera or enabled or disabled;
processing, by the mobile device, a neural network input comprising (i) one or more images derived from the query image, (ii) the device characteristics data, and (iii) data specifying respective locations of one or more eye landmarks in the query image using a gaze prediction neural network to generate a neural network output that characterizes a gaze position of the user in the query image, the processing comprising:
adjusting the locations of the eye landmarks in the query image according to the device characteristics data, and
processing the adjusted locations of the eye landmarks in the query image and the one or more images to generate the neural network output that characterizes the gaze position of the user in the query image; and
controlling, by the mobile device, one or more functions of the mobile device based on the neural network output.

10. The method of claim 9, wherein controlling one or more functions of the mobile device comprises providing an input to an operating system of the mobile device.

11. The method of claim 9, wherein the gaze prediction neural network has a plurality of device-independent parameters and a plurality of device-dependent parameters, the method further comprising:
maintaining data associating the device characteristics data with current values for the plurality of device-dependent parameters,
wherein processing the neural network input comprises setting the values of the device-dependent parameters to the current values associated with the device characteristics data.

12. The method of claim 9, wherein processing the adjusted locations of the eye landmarks and the one or more images to generate the neural network output comprises:
processing the adjusted locations of the eye landmarks and the one or more images in accordance with the device characteristics data to generate the neural network output.

13. The method of claim 9, further comprising:
obtaining one or more calibration images of the user captured using the camera of the mobile device and, for each of the calibration images, a respective calibration label that labels a known gaze position of the user in the calibration image; and
training the gaze prediction neural network using the one or more calibration images.

14. The method of claim 9, wherein the one or more images derived from the query image comprise a respective image crop corresponding to each of one or more eyes of the user.

15. The method of claim 9, wherein the neural network output comprises a measure of central tendency and a measure of variance of a distribution over possible gaze positions of the user in the query image.

16. A mobile device comprising one or more storage devices storing instructions that when executed by the mobile cause the mobile device to perform operations comprising:
obtaining, by a mobile device, a query image of a user captured by a camera of the mobile device;
obtaining, by the mobile device, device characteristics data characterizing one or more of a manufacturer of the mobile device, a model of the mobile device, a current orientation of the camera, or an indication of whether certain settings of the camera or enabled or disabled;
maintaining, by the mobile device, data associating the device characteristics data with current values for a plurality of device-dependent parameters of a gaze prediction neural network, wherein the current values of the plurality of device-dependent parameters have been determined by training the gaze prediction neural network on calibration examples each including the device characteristics data;
processing, by the mobile device, a neural network input comprising one or more images derived from the query image using the gaze prediction neural network, wherein:
the gaze prediction neural network has a plurality of parameters comprising i) a plurality of device-independent parameters that have been determined by training the gaze prediction neural network on training examples each including respective device characteristics data and ii) the plurality of device-dependent parameters, wherein device-independent parameters are parameters that, after training, have the same values regardless of the device characteristics data, and device-dependent parameters are parameters that have different values for different device characteristics of the mobile device;

the gaze prediction neural network is configured to, at run time and after the gaze prediction neural network has been trained, process the neural network input to generate a neural network output that characterizes a gaze position of the user in the query image; and processing the neural network input comprises setting the values of the device-dependent parameters to the current values associated with the device characteristics data; and controlling, by the mobile device, one or more functions of the mobile device based on the neural network output.

17. The system of claim 16, wherein controlling one or more functions of the mobile device comprises providing an input to an operating system of the mobile device.

18. The system of claim 16,
wherein the gaze prediction neural network comprises a plurality of neural network layers configured to apply the device independent-parameters to generate an initial neural network output that characterizes an initial predicted gaze position of the user, and wherein the gaze prediction neural network is configured to adjust the initial neural network output in accordance with at least some of the device-specific parameters to generate the neural network output.

19. The system of claim 18, wherein adjusting the initial neural network output comprises:
applying a linear device dependent parameters transformation to the initial neural network output.

20. The system of claim 16, wherein the neural network input further comprises data specifying a location of one or more eye landmarks in the query image.

* * * * *